United States Patent [19]

Hyde, Jr.

[11] 4,201,155
[45] May 6, 1980

[54] BIRD FEEDER

[75] Inventor: Donald B. Hyde, Jr., Waltham, Mass.

[73] Assignee: Hyde's Incorporated, Waltham, Mass.

[21] Appl. No.: 823,786

[22] Filed: Aug. 11, 1977

[51] Int. Cl.² ............................................. A01K 39/01
[52] U.S. Cl. ................................................... 119/51 R
[58] Field of Search ............................ 119/51 R, 52 R

[56] References Cited

U.S. PATENT DOCUMENTS

| 2,634,705 | 4/1953 | Mayes | 119/51 R |
| 2,683,440 | 7/1954 | Klix | 119/52 R |
| 3,186,379 | 6/1965 | Grella | 119/51 R |
| 3,568,641 | 3/1971 | Kilham | 119/51 R |
| 3,788,279 | 1/1974 | Boehland, Jr. | 119/52 R |

Primary Examiner—Louis G. Mancene
Assistant Examiner—Robert P. Swiatek
Attorney, Agent, or Firm—David E. Brook; James M. Smith

[57] ABSTRACT

An improved bird feeder is disclosed herein of the type having a hollow housing for holding a main supply of bird feed with a plurality of feeding apertures located at different heights thereon. This improved bird feeder has means for retaining a supply of bird feed at the vertically staggered feeding apertures which are independent of the level of main supply in the housing. Because of this, bird feed is provided at a feeding aperture even after the main supply has dropped below that feeding aperture.

8 Claims, 6 Drawing Figures

BIRD FEEDER

BACKGROUND OF THE INVENTION

1. Field of the Invention

This invention is in the field of bird feeders, and more particularly related to the type of bird feeder having a main hollow housing with vertically staggered feeding apertures cut therethrough.

2. Description of the Prior Art

A wide variety of bird feeders has been developed, including many which supply a number of feeding apertures from a central supply of feed. A representative sampling which are described in the patent literature includes the following.

Klix, in U.S. Pat. No. 2,683,440, discloses a bird feeder having a relatively large supply of bird feed provided for three feeding apertures. The Klix feeder has a hopper section, preferably made from transparent material, with a cylindrical shape at its top portion and a frusto-conical shape at its lower portion. The lower portion is designed so that a bird which is feeding must lower its head to pick feed from the central supply and subsequently step back before raising its head to crack the feed shell. The design is intended to insure that feed shells are dropped outside of the feeder instead of into the central supply of feed.

Another bird feeder having a relatively large supply of feed provided for a plurality of feeding apertures is taught by Boehland in U.S. Pat. No. 3,788,279. The Boehland feeder is formed from a hollow globe having a funnel mounted within it to divide the glove into an upper storage area and a lower feeding chamber. An orifice in the lower end of the funnel provides a flow of feed from the storage area to a plurality of ports located on the side of the lower hemispherical section.

Bird feeders of the type disclosed by Klix and Boehland do provide more than one aperture so that a number of birds can feed at one time. Nevertheless, their basic construction involves the concept of havng a main supply of bird feed located in the upper portion of a feeder whereas all of the feeding apertures are located at the bottom. This design restricts the number of feeding apertures possible, and therefore, the number of birds which can feed. In both of these feeders, as well as other feeders of this type, the number of feeding apertures which can be built into the feeder is restricted to the number which can be positioned around the circumference of the feeders at the same height.

To overcome this restriction, bird feeders have been proposed wherein feeding apertures are vertically staggered as well as horizontally staggered. One of these is disclosed by Mayes in U.S. Pat. No. 2,634,705. The Mayes bird feeder is a knock-down type formed from a series of wooden slats inserted into slots in the sidewalls of the feeder to form a plurality of feeding locations. Each feeding location is supplied with bird feed from a main supply in the central portion of the feeder.

Another design, and one of the more popular bird feeders, is that described by Kilham in U.S. Pat. No. 3,568,641. The Kilham bird feeder has a vertically disposed hollow tubular housing with a series of staggered openings through its sidewall which serve as feeding apertures. The specific designed feature stated to be novel is a baffle means provided within the main housing adjacent to feeding apertures. This baffle is generally arcuate in cross-section and extends substantially more than 180°. It serves to insure that feed will gravitate around the aperture to form a level of bird feed automatically at each baffle. Thus, when a bird inserts its head through a feeding aperture, it has free access to bird feed located beneath the baffle. As feed is eaten or agitated, the main supply automatically moves downwardly to maintain the feed level constant until the level of feed in the tubular housing drops below a particular aperture.

Although the Kilham bird feeder has proven to be very successful, it does have at least one serious drawback. Namely, as feed is depleted in the main tubular housing, it eventually drops below the higher feeding apertures. Thus, these apertures become inoperative since they no longer have a supply of feed. Because of this, the number of feeding apertures which are operative is directly related to the level of feed in the tubular housing. Thus, as feed is depleted, and the level drops, the advantage of providing a plurality of vertically staggered apertures is partially or totally offset. The higher feeding apertures can only be resupplied with feed by introducing a new supply of feed into the main housing, and it is not always convenient to do so each time the level of feed drops to a level lower than the higher feeding apertures.

SUMMARY OF THE INVENTION

This invention relates to an improved bird feeder of the type having a plurality of feeding apertures located at different heights on a main housing containing a supply of bird feed for the feeding apertures. Stated simply, the invention is the improvement of providing means for retaining a supply of bird feed at feeding apertures which is independent from the level of feed in the housing. When this is done, feeding apertures can retain a supply of feed even after the main supply of feed has dropped below their level.

The means for retaining a supply of bird feed at the feeding apertures can have a wide variety of configurations. In one embodiment, a feed-retaining baffle is positioned as a restraining plate located below a feeding aperture to block the passage of feed to lower portions of the housing. The restraining plate has an elevated portion at its center with a hole therein to allow feed to pass to a lower level in the housing after it has built up to the level of the elevated portion of the baffle.

In another embodiment, a hopper-shaped baffle is suspended from above a feeding aperture and provided with an opening which is aligned with the feeding aperture. As feed is introduced into the housing of the feeder, a supply is captured and held by the hopper-shaped baffle.

Other feed-retaining baffle designs could also be used as suitable means for retaining a supply of feed at feeding apertures which is independent from the supply in the main housing.

The primary advantage of the bird feeder of this invention is that it allows the full potential of vertically staggered feeding apertures to be realized in a bird feeder even after the feed level in the main housing has been partially depleted. In other words, depleting a portion of the main supply of bird feed in the main housing does not cause the most elevated feeding apertures to become inoperative. The means for retaining a supply of feed at feeding apertures insures that there will still be a supply of feed at each feeding aperture on the bird feeder. Thus, a plurality of feeding apertures is usable and operative even after a portion of the feed has been consumed.

DESCRIPTION OF PREFERRED EMBODIMENTS

Figure 1:
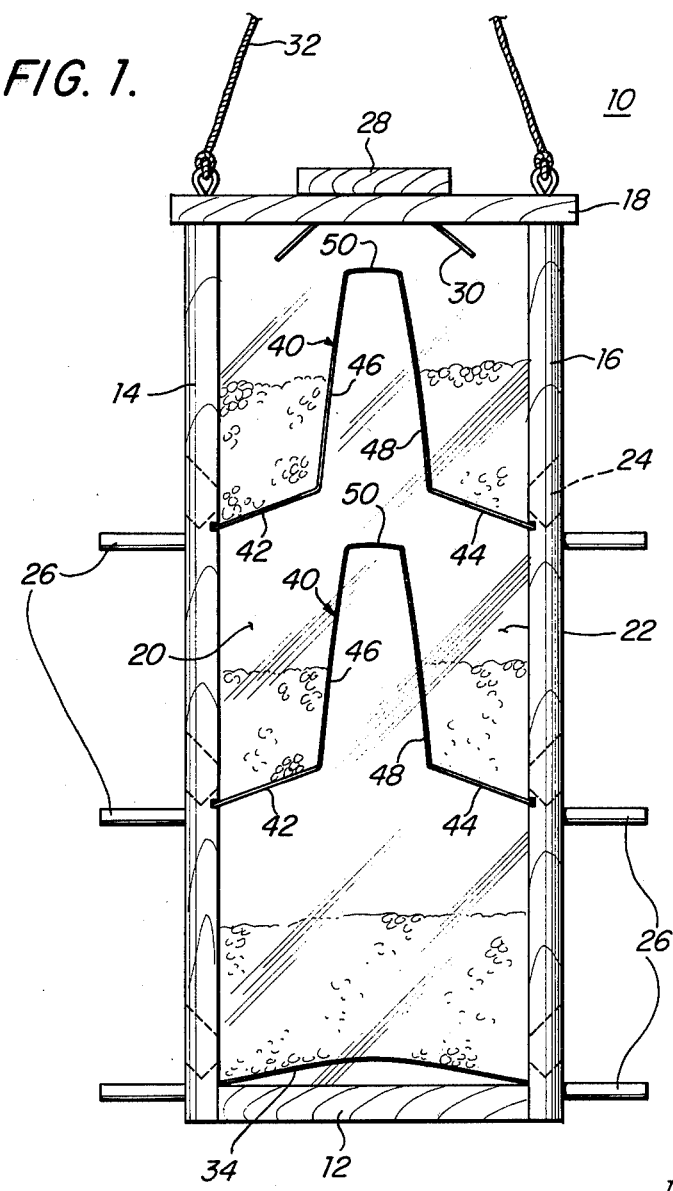
FIG. 1 is a front elevational view of one embodiment of a bird feeder according to this invention.
Figure 2:
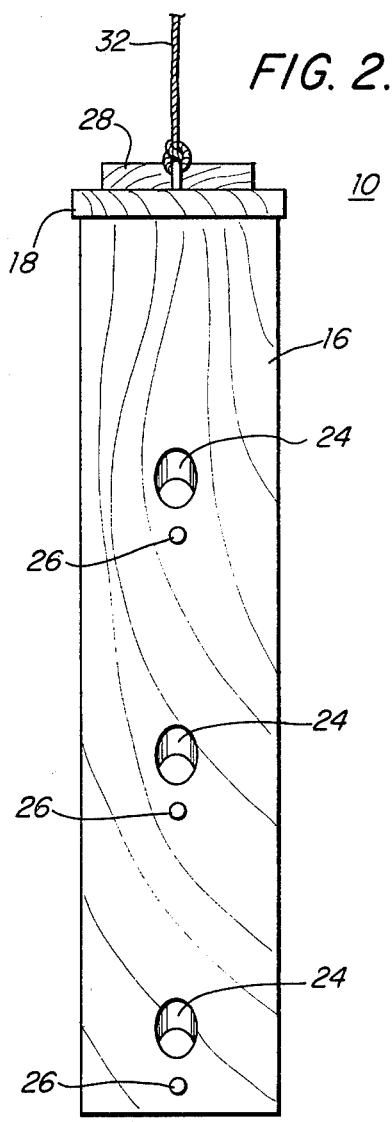
FIG. 2 is a side elevational view of the same bird feeder.
Figure 3:
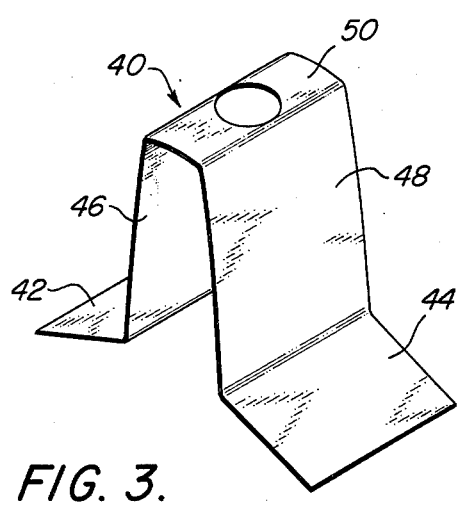
FIG. 3 is a perspective view of the particular feed-retaining baffle used in the bird feeder of FIG. 1.
Figure 4:
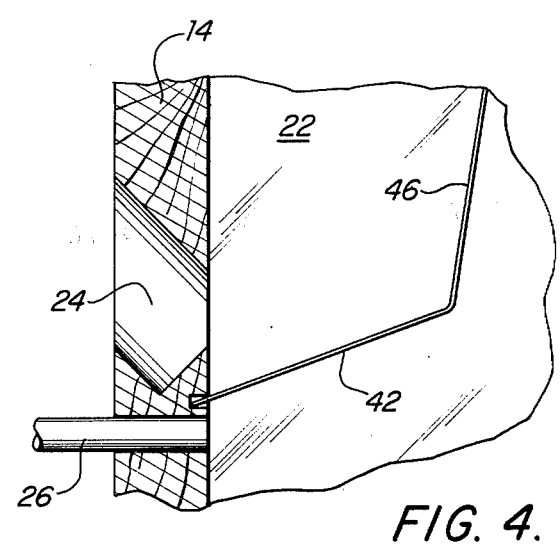
FIG. 4 is a fragmented sectional view illustrating how the feed-retaining baffle is joined to the sides of the bird feeder of FIG. 1.

The invention will now be specifically described by referring to the Figures in more detail.

FIGS. 1-4 illustrate a first embodiment of this invention. Therein, bird feeder 10 is illustrated and is formed from base 12, sidewalls 14 and 16, top wall member 18, transparent front wall member 20, and transparent rear wall member 22. Transparent front wall member 20 and back wall member 22 are typically fabricated from glass or transparent plastic, such as polymethyl methacrylate, styrene, etc. Front wall member 20 and rear wall member 22 are usually mounted in slots running along the inner surfaces of sidewall members 14 and 16, which makes it easy to remove them for cleaning.

As can be seen, bird feeder 10 has a series of vertically staggered feeding apertures 24 which extend through sidewall members 14 and 16. Posts 26 are located below feeding apertures 24, and serve as perching means for birds wishing to feed through apertures 24. Apertures 24 can be drilled through side members 14 and 16 at an inclined angle so that feed does not spill therefrom. Additionally, a slight ledge may be retained at the inner side of apertures 24 as an additional barrier to feed spillage, as illustrated most clearly in FIG. 4.

Removable cover 28 is maintained on top 18 by resilient member 30, which can be a strip of flexible plastic or metal which is wider than the hole through top 18. In addition, bail 32 is provided for hanging bird feeder 10 from the limb of a tree or other suitable location.

A lower feed support 34 is provided, and may be formed, for example, from an inverted, slightly arched piece of sheet metal. Feed for the lowest apertures builds up on support 34.

Two identical baffle members 40 are located within bird feeder 10 and serve as feed-retaining means for the elevated feeding apertures 24. As can be seen, the feed reservoirs at apertures 24 are independent of the supply of feed in the main housing. Baffles 40 are formed from a thin sheet-like material, which could be metal or plastic. The extremities extend into slots running horizontally along the inner surface of sidewall members 14 and 16 to fix baffles 40 in position.

Baffles 40 have a shape including base members 42 and 44, extending into slots located just below feeding apertures 24, and then running upwardly at a slight incline towards the center of bird feeder 10. Baffle bases 42 and 44 then undergo a sharp angle and continue as vertically oriented baffle wall members 46 and 48, respectively. These vertically oriented wall members 46 and 48 extend vertically to a horizontal connecting wall member 50. Top wall member 50 has a hole therethrough, which may or may not be aligned with the hole in top 18 through which a supply of bird feed is introduced into bird feeder 10.

In operation, a supply of bird feed is introduced to bird feeder 10 by removing cover 28 and pouring the feed through the hole in top 18. Some of the feed falls through the hole in baffle-connecting wall members 50 to the bottom of bird feeder 10 and then starts building upwardly from support 34. Other feed spills to the sides of the feeder and is retained by the base portions 42 and 44 of baffles 40. In this way, means for retaining feed at apertures 24 is provided, even after feed in the main housing is depleted to a level below baffle members 40.

Figures 5, 6:
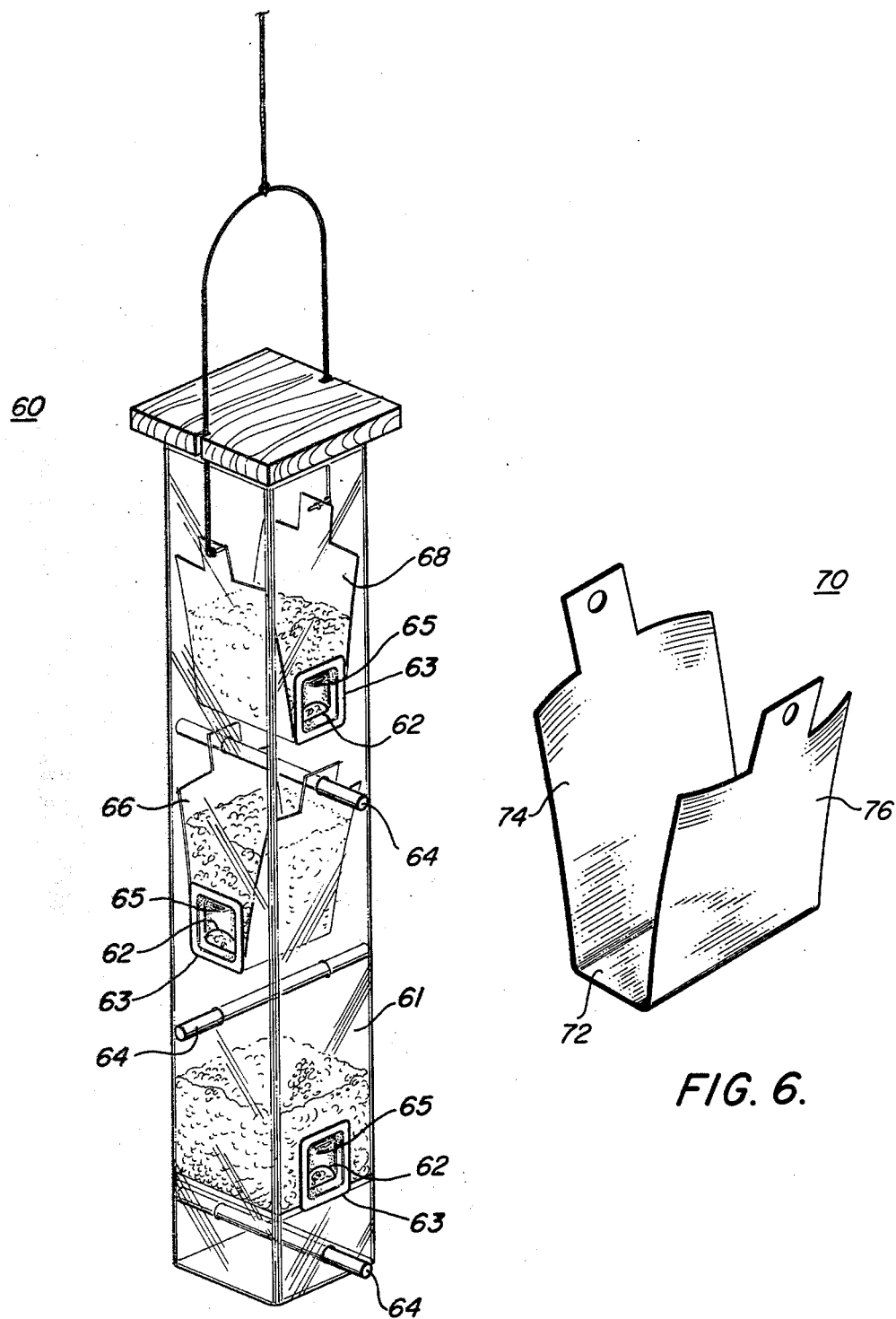
FIG. 5 is a perspective view of an alternative embodiment of a bird feeder according to this invention; and, FIG. 6 is a perspective view of the feed-retaining baffle used in the bird feeder of FIG. 5.

An alternative embodiment of a bird feeder according to this invention is illustrated in FIGS. 5 and 6. Therein, bird feeder 60 is illustrated as having a body 61 formed as an integral unit with an elongated, hollow, rectangular shape. This can be accomplished, for example, by extruding or molding a plastic material, which is preferably transparent, so that the level of feed can be viewed, into this shape. Feeding apertures 62 are present in a vertically staggered arrangement and extend through all four sidewalls.

Each aperture 62 is formed in an aperture element 63 which protrudes into and is supported by the hollow bird feeder body 61. Each aperture element 63 has a concave portion 65 and the aperture 62 is formed at the bottom of the concave portion. The aperture 62 thus angles back into the body 61 and faces inwardly and downwardly to retain the seed in the bird feeder body 61.

In this embodiment, posts 64 extend completely through opposite wall members to provide perchers for feeding. Hopper-shaped baffle 66 is suspended from post 64 and has a lower portion aligned with a feeding aperture 62. Similarly, hopper-shaped feed-retaining baffle 68 is supported from the ends of a bail protruding through the outer walls. Thus, feed collecting in hoppers 66 and 68 is available for feeding at apertures 62 even after the supply in feeder 60 has dropped below the level of the corresponding apertures 62.

As can be seen in FIG. 6, hopper-shaped feed-retaining baffle 70 is formed in a general U-shape by base wall member 72 and sidewall members 74 and 76. The opened, lower sides of the U-shape are aligned with feeding apertures to provide a supply of feed. Side wall members 74 and 76 have their upper corners bent inwardly to provide more containment for feed.

It will be clear to those skilled in the art that there are many equivalents to the specific design, configuration, materials, etc., described herein. These are merely preferred embodiments, and the appended claims are intended to cover all other equivalents.

What is claimed is:

1. In a bird feeder comprising a relatively elongated housing for holding a supply of bird feed and having a plurality of feeding apertures located at different heights thereon:
    the improvement of providing means for retaining supplies of bird feed at feeding apertures located at different heights, said means for retaining including at least one baffle for retaining seed at the height of the baffle independent of a lower level, said baffle permitting some seed to pass to the lower level.

2. The improvement of claim 1 wherein said baffle is hopper-shaped.

3. The improvement of claim 1 wherein said baffle comprises a restraining plate located under a feeding aperture to block the passage of feed in said housing and has a portion extending to an elevated portion having a hole therein to allow feed to pass therethrough to a lower level in said housing.

4. A bird feeder, comprising in combination:
   a. a hollow housing for holding a supply of bird feed;
   b. a plurality of feeding apertures located at different heights on said housing; and,
   c. baffle means for retaining a supply of bird feed at feeding apertures located at different heights on said hollow housing, said baffle means providing a supply of feed that is independent of a lower level of feed in said housing, but permitting some seed to pass to that lower level.

5. A bird feeder of claim 4 additionally including means to allow birds to perch on said housing whereby they have access to feed retained at feeding apertures by said baffle means.

6. A bird feeder of claim 5 wherein said means for perching comprise posts extending outwardly from said hollow housing.

7. A bird feeder of claim 4 wherein said baffle is hopper-shaped.

8. A bird feeder of claim 4 wherein said baffle means comprises a restraining plate located below a feeding aperture to block the passage of feed in said housing and has a portion extending to an elevated portion having a hole therein to allow feed to pass therethrough to a lower level in said housing.

* * * * *